Aug. 29, 1939. E. P. LA BOUNTY Re. 21,188

CENTRIFUGAL CAN FEEDING MEANS

Original Filed Aug. 2, 1935 2 Sheets-Sheet 1

Inventor

E. P. La Bounty

By Clarence A. O'Brien

Attorney

Aug. 29, 1939. E. P. LA BOUNTY Re. 21,188
CENTRIFUGAL CAN FEEDING MEANS
Original Filed Aug. 2, 1935 2 Sheets-Sheet 2
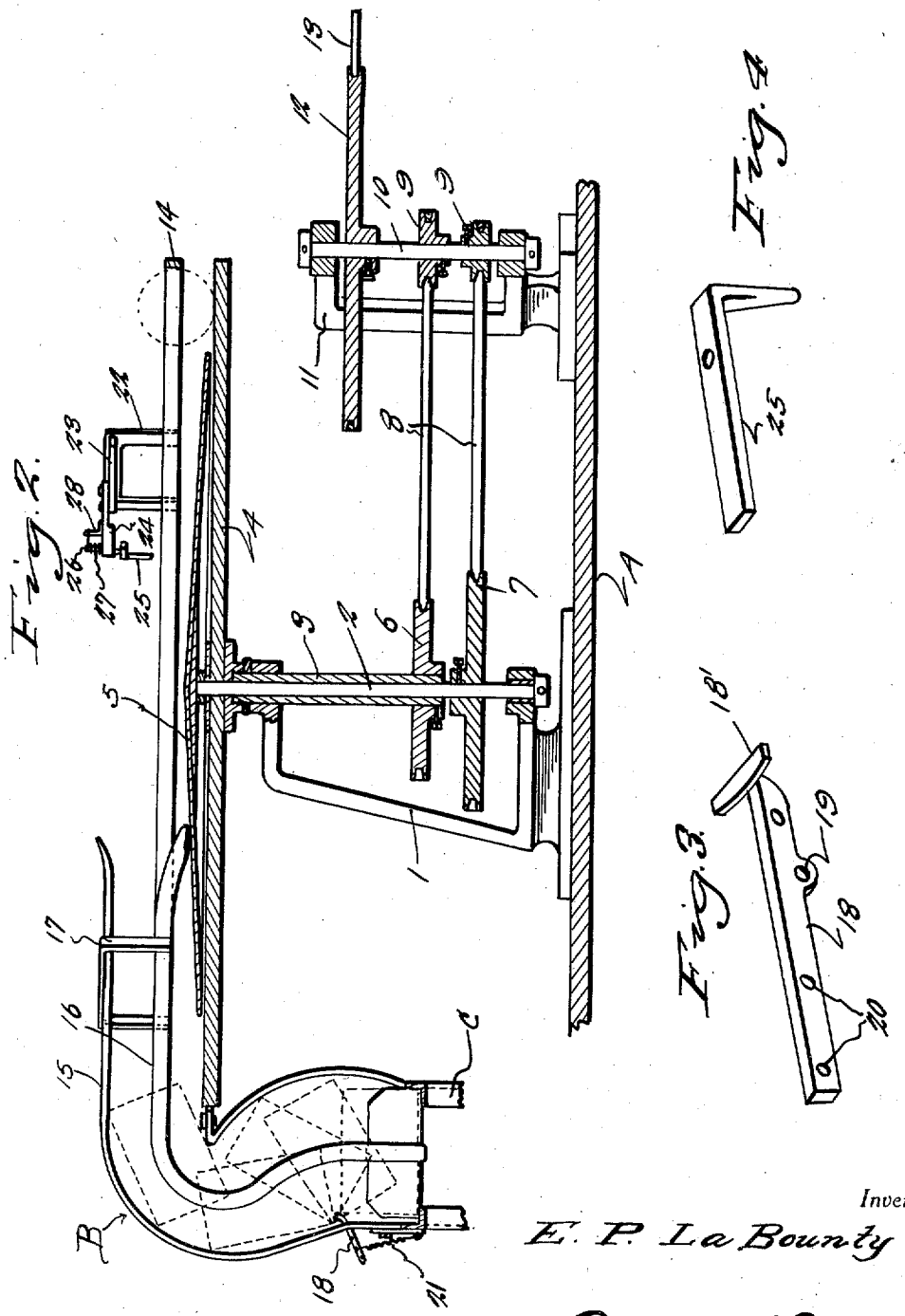
Inventor
E. P. La Bounty
By Clarence A. O'Brien
Attorney Reissued Aug. 29, 1939 Re. 21,188

UNITED STATES PATENT OFFICE 21,188

CENTRIFUGAL CAN FEEDING MEANS

Eddie P. La Bounty, Hoopeston, Ill.

Original No. 2,032,619, dated March 3, 1936, Serial No. 34,449, August 2, 1935. Application for reissue August 30, 1937, Serial No. 161,660

6 Claims. (Cl. 198—33)

This invention relates to a centrifugal can feeding means for receiving indiscriminately positioned cans and for arranging the cans in regular predetermined relation for use in canning operations. The general object of the invention is to provide means whereby cans placed in a pile on a rotating member are moved by centrifugal force upon single file conveying means which may preferably take the form of another rotary member which conveys the cans in lengthwise position through a chute which deposits cans to a gravity chute, in rolling procession, with means whereby any can moving onto the second rotary member in improper position will be turned to proper position on the second member.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views and in which:

Fig. 2 is a section on the line 2—2 of Fig. 1.

Fig. 3 is a view of the bumper member.

Fig. 4 is a view of the tripper.

Figure 1:
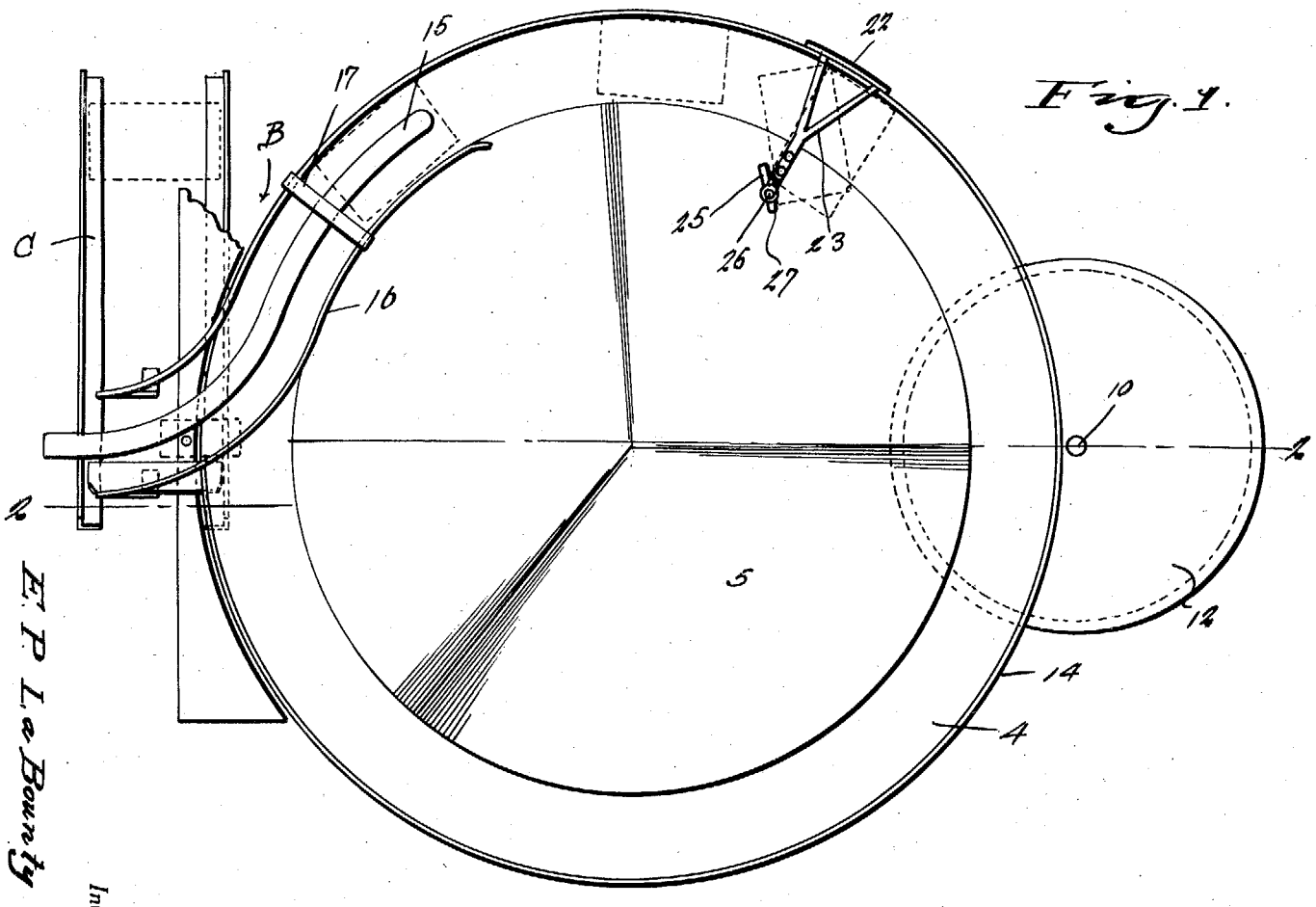
Fig. 1 is a top plan view of the device.

In these drawings the letter A indicates a base to which is secured an upright bracket 1 which rotatably supports a shaft 2 which is vertically arranged and which is surrounded by a hollow shaft 3 which is also rotatably supported by the bracket 1. A disc 4 is connected to the upper end of the hollow shaft 3 and a convex disc 5 is connected to the upper end of the shaft 2, this disc 5 being arranged above the disc 4 and being much less in diameter than the disc 4 and concentrically arranged in relation thereto. A pulley 6 is connected to the lower end of the hollow shaft 3 and a pulley 7 to the shaft 2, belts 8 passing over these pulleys and over the pulleys 9 on a shaft 10 supported by an upright bracket 11 from the base A, the shaft being driven from any suitable source of power through means of the pulley 12 and the belt 13. These parts are so arranged that the flat disc 4 revolves faster than the convex disc 5. Thus, the disc 5 forms a rotary table to receive indiscriminately positioned cans and effect outward movement of such cans onto the projecting portion of the disc 4 which provides conveying means to receive and carry the cans in single file and in end to end relation to a discharge point. Because of the differential speed provided between discs 4 and 5, cans on disc 5 can move or roll outwardly thereof and find their place on disc 4 without interference or jamming.

A substantially circular guide rail 14 is spaced above the two discs and acts to guide the cans to the chute B which is comprised of the top rail 15 and the side rails 16 which are connected together as shown at 17. The inlet end of the chute B flares as shown in Figs. 1 and 2 so that the cans can readily enter the same and said chute is provided with a substantially horizontal inlet portion and with a depending exhaust portion which discharges the cans upon a gravity chute C. The depending portion of the chute B is wider as shown in Fig. 2 so that the cans entering the chute in endwise position can turn to fall upon the gravity chute C upon their sides in rolling procession, as shown in dotted lines in Fig. 2. In order to facilitate this turning of the cans in the depending portion of the chute B, I provide a bumper member 18, as shown in detail in Fig. 3 and including a shank and a cross head 18′ which engages the corners of the descending cans as shown in dotted lines in Fig. 2. The shank is pivoted intermediate its ends to a part of the chute by a pivot pin passing through the hole 19 in the shank and said shank is provided with a plurality of holes 20 for receiving a hook on a spring 21 which normally holds the head 18′ in raised position and permits the head to move downwardly when struck by a can so that this member acts as a bumper to take the jar off cans and also acts to cause the tilting action of the cans as shown in dotted lines in Fig. 2, whereby the cans are repositioned from their end to end relation in the discharge chute B into a rolling procession on the gravity chute or conveyor C.

As stated above, the tendency of the cans moving outwardly of the disc 5 is to roll until stopped by the guide rail 14 in end to end relation on the disc 4. Some cans, however, may move outwardly so as to be received by the disc conveying means 4 with their length crosswise thereof, and means is provided for repositioning such cans into end to end relation on the conveying means. A bracket 22 is attached to the guide rail 14 and carries an inwardly extending V-shaped member 23 to the inner end of which is adjustably connected a bar 24 to which is pivoted a substantially L-shaped tripper finger 25, the pivot pin of which is shown at 26. A spring 27 surrounds and is connected with the pivot pin and has one end connected to a bracket 28 on the arm 24, the spring acting to hold the finger in the position shown in Fig. 1. Thus, the tripper finger 25 and the parts associated therewith provide yieldable means for repositioning any cans which have their ends engaged with the guide rail 14 into end to end relation on the disc 4.

The cans are dumped on the convexed disc 5 from a belt or by any other means and the rotating disc 5 causes the cans to move outwardly under centrifugal force upon the exposed portions of the disc 4. Most of the cans will pass upon the disc 4 against the rail 14 in lengthwise position with their side portions engaging the rail. However, some of the cans will have their ends strike the rail as shown to the right in Fig. 1 and as soon as they strike the tripper finger 25 they will be caused to turn to endwise position as shown to the left in Fig. 1. Cans after passing the tripper finger are moved by the disc 4 into the chute B through which they travel and drop upon the gravity chute C, the cans being turned by the bumper member 18 in the lower part of the chute B so that they fall upon the member C on the sides and will thus roll down the same.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. A device of the class described comprising a rotary disc, a convex disc of smaller diameter than the first-mentioned disc and located above the same, means for rotating the two discs, said means rotating the first-mentioned disc at a greater speed than the convex disc, a guide rail located above the periphery of the first-mentioned disc, tripping means for turning any cans that have their ends strike the guide rail, a chute for receiving the cans from the first-mentioned disc, said chute having a depending part, a gravity chute receiving the cans from the first-mentioned chute and means for causing the cans to turn and drop sidewise upon the gravity chute.

2. In a can handling device of the class described, a horizontally arranged disc, means for rotating the same, a smaller concentrically arranged convex disc above the first-mentioned disc, means for rotating the same at a lower speed than the first-mentioned disc, a concentric guide rail located above the periphery of the first-mentioned disc, an adjustable spring actuated tripper finger carried by the guide rail for turning cans that strike the guide rail on their ends, a chute for receiving the cans from the first-mentioned disc, said chute having a depending portion which is enlarged, a spring-pressed bumper member pivoted to the depending part and having a head against which the cans strike and which causes the cans to tilt sidewise in the enlarged part of the chute, and a gravity chute for receiving the cans from the first-mentioned chute.

3. In a device for rearranging elongated cans and the like articles from a promiscuous arrangement into a single file, a rotary table for receiving said articles in a promiscuous arrangement, means for driving said table at a speed to move articles outwardly thereof by centrifugal force, conveying means arranged concentrically with said table adjacent the outer edge thereof in can receiving relation, said conveying means being constructed to accommodate a single file of said articles thereon in endwise relationship, and means for driving said conveying means in the same direction as and at a greater speed than said table to provide for relative movement therebetween, whereby articles moving outwardly of said table are arranged in single file spaced relation on said conveying means.

4. A device for rearranging elongated cans or like articles from a promiscuous relation into a single file, comprising rotary means for receiving such articles in promiscuous arrangement, means for driving said rotary means to subject such articles to a centrifugal force to move them outwardly of said rotary means, a single file rotary conveyor associated in concentric article receiving relation with said rotary means for movement relative thereto, and means for driving said rotary means and said conveyor in the same direction with said conveyor traveling faster than said rotary means, whereby articles thrown outwardly of said rotary means by centrifugal force are arranged in single file on said conveyor.

5. A device for rearranging elongated cans and the like from promiscuous relation into a single file, comprising rotary means for receiving articles in promiscuous arrangement and subjecting such articles to a centrifugal force, concentric single file rotary conveying means associated with said rotary means for receiving cans discharged by centrifugal force from said rotary means in either lengthwise or crosswise position and for conveying said cans in endwise relation, means for driving said rotary means and said conveying means including means for imparting a higher speed to said conveying means than that of said rotary means, and means for repositioning cans received by said conveying means with their length crosswise thereof to dispose said repositioned cans in endwise relation on said conveying means.

6. A device for rearranging elongated cans and the like from a promiscuous relation into a single file, comprising rotary means for receiving such articles in promiscuous arrangement, means for driving said rotary means to subject such articles to a centrifugal force to move them outwardly of said rotary means, concentric single file rotary conveying means associated with said rotary means for receiving cans therefrom and for conveying the cans in endwise relation, means for driving said conveying means at a greater speed than said rotary means to provide for relative movement therebetween, and means for repositioning cans received by said conveying means with their length crosswise thereof to turn said cans into endwise relation on said conveying means.

EDDIE P. LA BOUNTY.